Sept. 2, 1941.   E. REED   2,254,314
APPARATUS FOR WELDING THIN SILICON STEEL AND THE LIKE
Original Filed June 6, 1938
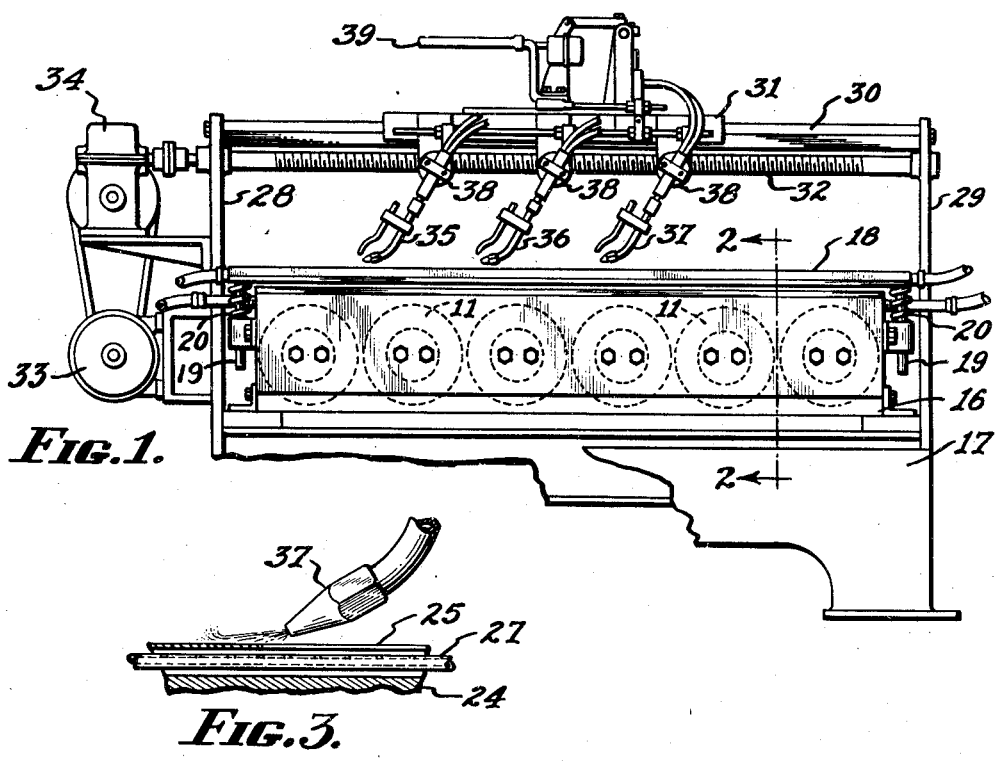
FIG. 1.
FIG. 3.
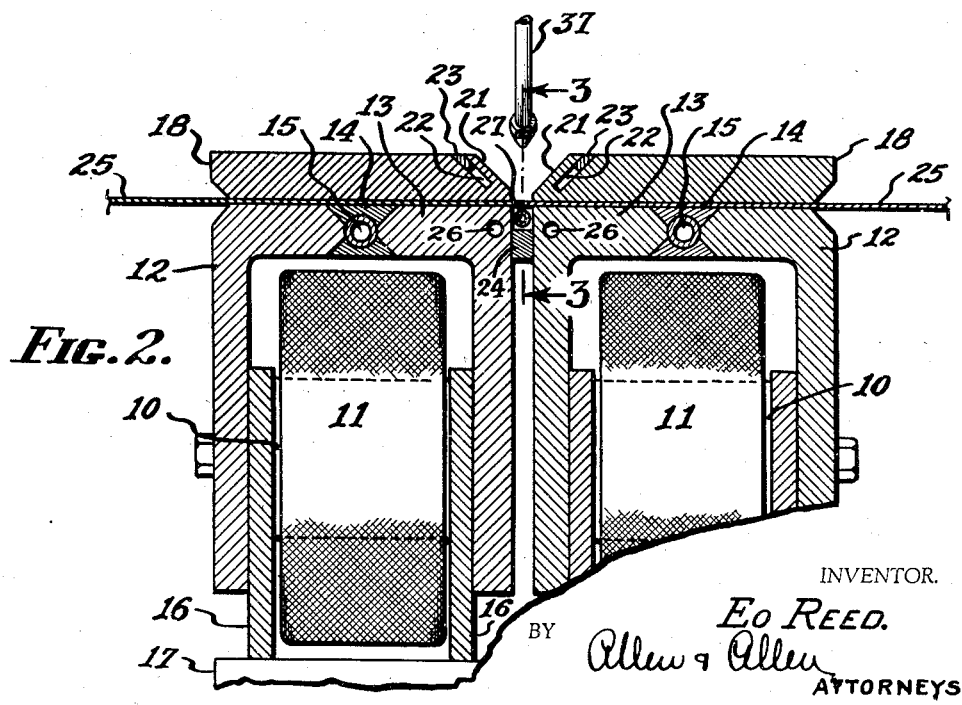
FIG. 2.
INVENTOR.
Eo Reed.
BY Allen & Allen
ATTORNEYS.

Patented Sept. 2, 1941

2,254,314

UNITED STATES PATENT OFFICE 2,254,314

APPARATUS FOR WELDING THIN SILICON STEEL AND THE LIKE

Eo Reed, Zanesville, Ohio, assignor to The American Rolling Mill Company, Middletown, Ohio, a corporation of Ohio Original application June 6, 1938, Serial No. 212,039, now Patent No. 2,219,493, dated October 29, 1940. Divided and this application May 6, 1939, Serial No. 272,234

1 Claim. (Cl. 113—99)

This application is a division of my copending application Serial No. 212,039, filed June 6, 1938, now Patent 2,219,493, Oct. 29, 1940.

My invention has gone into commercial practice in the production of large coils of thin silicon steel sheet material, which coils are used by way of example, for the substantially continuous feeding of stamping machines in the production of transformer core stampings. The continuous feeding of such machines is a matter of considerable commercial economy both in the operation of the machine and in the elimination of waste material, as will be clear. I shall describe my invention in connection with the formation of such coils of thin silicon steel sheet material, it being understood that the principles of my invention are applicable to other materials.

My invention is related to and constitutes an improvement upon what is set forth in certain copending applications as follows: Serial No. 132,824 Fay and Reed, Welding process and apparatus for thin sheet metal, filed March 24, 1937, Serial No. 132,826, Asbury and Reed, Process and apparatus for coiling strip material, filed March 24, 1937, and Serial No. 132,825 Fay and Reed, Process and apparatus for securing accurately butted sheet ends for welding, filed March 24, 1937. In the present invention a number of the principles set forth and claimed in these copending cases are employed.

The fundamental object of my invention is the provision of a simple, accurate, commercially successful apparatus for the butt welding of thin sheet metal materials so as to form greater effective lengths thereof, by means of welds which are formed by interfusion of the metal of the butted sheet edges, and which welds are not substantially thicker, if at all, than the gauge of the sheet members themselves.

The ancillary objects of my invention will be set forth hereinafter or will be apparent to one skilled in the art upon reading these specifications; and I accomplish these several objects by that certain construction and arrangement of parts of which I shall now describe an exemplary embodiment. Reference is made to the drawing wherein:

Figure 1 is a front elevation of a welding device constructed in accordance with my invention.

Fig. 2 is an enlarged sectional view taken along the line 2—2 of Fig. 1, but showing a pair of sheets clamped in butted relation preparatory to welding, and Fig. 3 is a fragmentary section taken along line 3—3 of Fig. 2, but showing the torch lowered to welding position.

In the practice of my invention, sheet or strip materials to be welded together are first placed on a table (not shown) having guide means thereon. With the sheet edge held against the guide means the end of each sheet is sheared by a mechanism comprising a magnetic hold down which clamps the end of the sheet under a given force effective over a given area and a shear mechanism which accurately shears the sheet end square. After one end of the sheet is sheared the sheet is reversed and its other end sheared. By the procedure thus described, all ends of sheets to be joined by welding are sheared under identical conditions of clamping area and pressure. As set forth in the copending application of Fay and Reed, these sheets although quite thin, can be properly welded together if clamped during the welding under identical conditions of clamping and pressure, even though the sheets are characterized by considerable waviness and lack of flatness.

The sheets which have been sheared are transferred to a welding device such as illustrated in the drawing. Here there are a pair of clamps, one for holding the edge of each of the sheets which are to be joined together, and the clamping area and pressure at this point are identical with the clamping area and pressure employed in shearing the sheets. By the clamping means the sheet edges (in view of the shearing which has already been accomplished) are accurately butted and accurately held in butted relationship.

Different constructions of the magnetic clamping means may be employed; but an essential feature is the securing of a particular pressure effective over a particular area extending back from the edge of each of the sheets to be welded. The reasons why this is so have been made clear above.

The magnetic hold down means for the welding device are shown in section in Fig. 2. These comprise interspaced core elements 10 bearing coils 11. Pole pieces 12 and 13 are provided, which in the particular instance approach each other above the coils and substantially along the center axis of the clamping means. The interspace between the pole pieces is filled as at 14 with non-magnetic material such as brass or bronze, and is centrally perforated as at 15 for the passage of a cooling fluid. By reason of the fact that in welding the trailing edge of the strip is to be joined to the leading edge of a sheet, two magnetic hold down clamps are provided. These are similar in construction as shown. They are supported by suitable means 16 upon a bed 17 of the welding machine.

Cooperating with the magnetic structure just described are clamping plates 18 mounted (as shown in Fig. 1) on rods 19 and urged upwardly by means of springs 20. The members 18 are, of course, of magnetic material. The respective areas of the members 18 and the pole faces of the magnetic means will be the same as the effective area of the magnetic clamp on the shear for reasons which have already been made clear.

The forward edges of the members 18 are beveled as at 21, and are slotted near the beveled edges as at 22, the slot being plugged at the surface of the member by welding as at 23. This leaves a passageway near the edge of each member 18 for cooling fluid.

The clamping means are slightly interspaced as clearly shown. Between them there may be placed a spacer bar 24. The sheet material 25 is butted as is shown, and firmly held by the clamps in exact relationship for welding. Additional passageways for coolant fluid may be formed as at 26 in the magnetic means. Above the spacer bar 24, we place, preferably, a tube 27, which tube is closed at one end and has a series of perforations in its upper surface. During the welding, a non-oxidizing gas, for example nitrogen, is thus maintained in the space immediately below the butted edges of the sheets. I find this to be of material assistance in the formation of welds in thin silicon steel. It prevents oxidation occurring on the underside of the weld, and also renders somewhat less critical the control of the flame applying means. For some types of work and for work with other metals, the use of a non-oxidizing gas will not be found necessary.

The welding is done by means of a torch having substantially a neutral flame.

The use of means beneath the weld for supplying from an external source a neutral gas make it unnecessary to cause the torch tips to ride on the work as was hitherto found desirable. This simplifies somewhat the mounting and control of the torch means and minimizes wear.

A number of torches may be used simultaneously at interspaced moving positions to shorten the stroke of the machine and speed up the welding operation. In the exemplary embodiment, I have shown three torches.

As shown in Figure 1, on end standards 28 and 29, we mount a pair of guide rails 30 for a head indicated generally at 31. A threaded shaft 32 for moving this head is journaled in the standards 28 and 29 and is arranged to be driven by a motor 33 through a gear box 34. The head bears torches 35, 36, 37 respectively mounted on swivel joints 38 by means of clamps. By a suitable linkage means, not to be herein described, the swivel joints are operable from a lever 39 by which lever the torches may be varied from the position shown in Fig. 1 (where they are away from the work) to the position shown in Fig. 3, where the torch is in welding position.

In operation, the torches being in the position shown in Fig. 1 and to the left of the apparatus, the operating lever 39 is thrown. This brings the torches down to operating position. The throwing of the operating lever also operates a half nut (not shown, but suitably mounted in the head) to engage the threaded shaft 75. This shaft being driven by the motor 33 causes the entire head to move to the right in Fig. 1, thereby progressively effecting a weld between the sheet metal pieces 25. At the conclusion of the welding stroke the torches are raised and the carriage is traversed back to the starting position, by means of a counter weight arrangement which is not shown and which forms no part of the present invention.

Modification may be made in my invention without departing from the spirit of it.

Having thus described my invention what I claim as new and desire to secure by Letters Patent, is:

In combination in welding apparatus, a pair of interspaced magnetic clamping means, the upper edges of which form a substantially coplanar table, clamping plates in connection with said clamping means, a filler block interposed between said magnetic clamping means and interspaced from the plane of said table, and a perforate tubing for the delivery of neutral gas lying above said filler block and between a surface of said filler block and the plane of the said table.

EO REED.